3,577,368
BARK FIBER AS A REINFORCING AND STABILIZING AGENT FOR HIGH TEMPERATURE MOLDING THERMOPLASTICS
Hubert E. Hendrickson and Charles N. McCain, Longview, Wash., assignors to Weyerhaeuser Company, Tacoma, Wash.
No Drawing. Filed Mar. 8, 1967, Ser. No. 621,436
Int. Cl. C08f 29/10, 45/18
U.S. Cl. 260—17.4       4 Claims

ABSTRACT OF THE DISCLOSURE

The invention comprises the use of Douglas fir bark fiber as a stabilizer for polypropylene molding compounds. The bark fibers may be incorporated into the molding compound by simple blending methods to provide a homogeneous molding premix, yet provide superior physical properties to the article of manufacture as well as improved heat stability.

BACKGROUND OF THE INVENTION

In the art of molding plastic compounds, it is common practice to use a fibrous reinforcing material to upgrade the physical properties thereof. The fiber material is used where the plastic itself cannot provide the desired properties or where the same or better properties can be achieved at a lower cost. Thus, the use of reinforcing materials has always been of high interest to plastic molders where they can permit them to pass new markets by supplying a superior plastic material.

With thermoplastic compositions moldable at relatively low temperatures, such as low density polyethylene, polystyrene, or polyvinyl chloride, it has been proposed to employ chopped glass, chopped sisal, asbestos, rags, cotton flock, wood flour, bark powders, bark fibers, and mineral fillers for various and sundry reasons. However, with the advent of the high temperature thermoplastic molding compositions, such as polypropylene, the reinforcing material has been exclusively mineral fillers such as asbestos, glass or talc, as disclosed in British Pat. No. 945,202. However, these filler materials cause the thermoplastic to decompose at elevated temperatures and/or have poor handleability in dispersing the filler material within the plastic matrix. In addition, there is a very serious problem of uniformly dispersing any of these filler materials within the plastic matrix. Mineral filler materials have been exclusively used in polypropylene primarily because a molding temperature of at least 400° F. and with a maximum of about 550° F. is required. These are well above the scorching temperature of any cellulosic material. Thus, a wood derived material would not be expected to be useful as a reinforcing material for these high temperature molding compounds.

BRIEF DESCRIPTION OF THE INVENTION

The present invention is predicated upon the finding that certain bark fibers can be successfully incorporated into polypropylene and the mixture molded in the usual manner. The bark fibers employed with the present invention may be caustic extracted Douglas fir bark fiber or a substantially pure bark fiber that has been mechanically separated from other bark contaminants such as cork and phloem tissue. The use of the bark fibers of the present invention with polypropylene significantly improves certain critical properties such as high temperature stiffness without increasing the cost of the base material. The good free flowing properties of the bark fibers can be used to advantage by the molder by simply blending the fiber and polypropylene prior to being fed to the molding machine. The end result in a molded part with uniform distribution of bark fiber that has been achieved at no special effort or expense on the part of the molder. All of the other known fillers now on the market pose drawbacks when attempting to add them at the injecting molding machine. The addition of the bark fibers to polypropylene substantially increases the impact strength, and the modulus of elasticity both in flexure and tension, particularly under higher temperature operating environments. This is accomplished with a significant increase in heat aging stability in the molded product.

DETAILED DESCRIPTION OF THE INVENTION

In the practice of the present invention, substantially uncontaminated bark fibers are employed with a polypropylene molding material. The bark fibers of the present invention are preferably those separated from raw bark with an aqueous alkali treating agent. As is well known, raw Douglas fir bark contains cork and phloem tissue in addition to the fiber. When bark fiber having a high percentage of cork and phloem tissue, herein defined as contaminants, is used in polypropylene molding compositions, various adverse effects are noted during molding which detrimentally affect the end product. Thus, the Douglas fir bark fibers usable with the present invention may be prepared by reducing the raw bark to a particular particle size. The bark is then subjected to a chemical treatment in which it is reacted with an aqueous alkaline treating agent broadly comprising a basic-acting compound of an alkali metal or ammonium hydroxide, preferably sodium hydroxide. Other treating agents such as caustic potash, sodium carbonate, sodium bicarbonate, borax, and ammonium hydroxide may be used. The bark is treated with the alkaline material in either single or multiple stages either batchwise or continuously with an alkali usage from 5 to 25% and at a consistency of the bark of 5 to 40%. Appropriate amounts of water are used to produce these conditions. The treating time is variable although in general a period of from 30 to 180 minutes is adequate at a temperature range of ambient to above the boiling point. This treating process of the whole bark essentially removes all the contaminating materials from the bark fiber fraction which may be subsequently washed, dried and screened for use with the present invention. For a more detailed description of the process of obtaining the substantially uncontaminated bark fibers reference is made to U.S. Pat. No. 2,890,231 and U.S. Pat. No. 3,245,869.

The bark fibers usable with the present invention may also be obtained by mechanically separating the bark fiber from the contaminating materials by first grinding the bark in a hammermill or the like and then screening in such a manner so as to separate the cork and other contaminating materials from the bark fiber. For a complete description of mechanically separating the bark fiber from the contaminating materials, reference is made to U.S. Pat. No. 2,446,551.

A Douglas fir bark fiber will have a length of about 1 mm. and an average length to diameter ratio of about 15:1. The Douglas fir bark fibers are hard and spindle-like in shape and have substantially a smooth outer surface. These characteristics of the bark fiber are essential to its successful performance in the present invention.

When the substantially uncontaminated bark fibers have been obtained, they are screened so as to provide a uniform size which will pass through a 24 mesh screen and be retained on a 325 mesh Tyler screen. If a significant amount of material with particle size larger than 24 mesh is present, imperfections will occur on the molding surface and the end product will not be acceptable. Also, dust problems can occur whenever particle sizes smaller than 325 mesh are present.

Before the bark fibers have been screened to a requisite size, they are dried to a moisture content of about less than 8% but preferably between 2 and 4%. However, when molding with polypropylene with bark fibers dispersed therein, up to 13% by weight moisture content is permissible when molding small parts. However, in most applications of the polypropylene molding compositions, large parts are formed and blistering will occur if the moisture content is above 8% because of the moisture vapor being driven off at the high molding temperatures. The specific gravity of the bark fibers is approximately 1.4. The fibers are stiff rather than flexible, such as the asbestos heretofore widely used. Moreover, when the bark fibers are intermixed with polypropylene flakes balling up or formation of bundles of fiber material does not occur because of the stiffness, size, density and shape of the fibers. As is well known in the molding art, asbestos or other materials will tangle and ball up giving rise to gross imperfections in the final molding.

The molding materials employed with the present invention may be those commercially available polypropylene compounds usable for molding compositions. These may be used in the standard injection molding processes and apparatus. Examples of commercially available polypropylene molding compositions are "Profax" sold by Hercules Incorporated of Wilmington, Delaware; "Tenite" manufactured by Eastman Chemical Products, Inc., Kingsport, Tenn.; "Escon" by Enjay Chemical Company, New York, N.Y., and others. Basically these polypropylene materials must be molded at temperatures of between 400 and 550° F. for optimum use. These materials are used for molding as sold, or for further processing with reinforcing material and other ingredients as the molder sees fit. A preferred form for this invention is the flake or powder type, rather than the pellets.

The polypropylene Douglas fir bark fiber compositions may contain from 5% to 50% bark fiber by weight. Below 5% little stabilizing or reinforcing effect is noted. Above 50% flow becomes too stiff to handle in conventionally sized molding equipment. A preferred amount of bark fiber would be from 15% to 30% by weight of the compound.

When blending the polypropylene with the bark fibers, standard blending equipment may be employed to bring about an essentially homogeneous mixture with the fibers blended throughout the polypropylene. Such mixing equipment may take the form of ribbon blenders, tumble blenders or the like. Surprisingly, after the polypropylene and the bark fibers have been mixed no stratification of the bark fibers will occur upon subsequent handling.

The reason for the elimination of the stratification phenomenon is not fully known, but is believed due in large part to the unusual geometry of the fibers. Also, it is believed that during the mixing process an electrostatic charge is generated between the bark fibers and the polypropylene due to the frictional forces created during the intermixing of the fibers and the polypropylene. This phenomenon attracts the fibers to the polypropylene and aids in the elimination of the stratification. The electrostatic charge soon dissipates upon standing, but is apparently reformed during any subsequent agitation or handling. Other materials such as asbestos commonly used as reinforcing agents inherently stratify when simply mixed with a pellet or flake type polypropylene, thus yielding a composition of little or no commercial value. Because of the freedom from stratification on handling, the mixed compositions can be bagged and shipped, if desired, or they can be used on the location where blended.

As is shown in the aforementioned British Pat. 945,202, the normal procedure for making a reinforced polypropylene molding composition is far more complex than the above described method. Prior art practice is to mill or otherwise subject the polypropylene-filler mixture to high shear mixing at elevated temperatures above the softening point of the resin. The heated mixture is then typically extruded into small rods and these are then chopped into short lengths to produce a conventional pellet. This procedure is not only time consuming and very costly, but it can result in degradation of both the resin and filler due to exposure to the high temperatures and severe mechanical action. It should be pointed out that this complex operation is necessary because of the segregation and stratification that occurs between the polypropylene granules and the prior art filler materials when these are simply mixed together. Also, with fibrous materials such as asbestos it is almost impossible to produce a reasonably homogeneous blend free from lumps of the mineral filler. Bark fiber polypropylene blends can, of course, be subjected to the above treatment if desired but, as has been pointed out previously, this is entirely unnecessary, particularly when a flake or powder type polypropylene is employed.

In the process of forming a molded polypropylene product with the composition of the present invention, the premix is merely poured into a standard injection molding machine hopper and is fed by the screw or plunger to an exit orifice, and thence into the mold. The molding temperature may be between 360° F. and 430° F., preferably between 370° F. and 400° F. It was totally unexpected that quality moldings could be made at temperatures this low since normally temperatures of 450° F. and above are employed when molding polypropylene. This again is a unique contribution of the bark fiber. The use of bark fiber not only permits molding at these lower temperatures, but it also overcomes stress and warpage problems that essentially prevented the prior art compounds from being molded in this temperature range. Another surprising and totally unexpected feature was the almost complete lack of scorching and gas evolution from the bark fiber in the molding composition. Normally cellulosic materials will begin to scorch at about 300° F. This knowledge alone would tend to prevent one skilled in the art from employing them with a plastic material usually molded at 450° F. At the times normally experienced in an injection molding operation there has been no tendency to scorching or gas evolution of the polypropylene-bark fiber compounds when molding temperatures as high as 430° F. were employed.

Products formed using the composition of the present invention have excellent stiffness characteristics and improved stability when tested on heat aging.

The following examples will describe the best known mode of operation of the invention, but are not intended to be limiting:

EXAMPLE I

In order to show the increased stability of the bark fibers of the present invention when combined with polypropylene, a sample of polypropylene flakes was obtained containing a conventional chemical stabilizer dispersed therein. The sample was combined with 25% of the total weight of the bark fibers. The bark fibers were tumble blended with the polypropylene flakes prior to injection molding. Specimens were formed 1" x 1" x .080" for testing. An additional sample was formed in the same manner but using 40% by weight asbestos (anthophyllite) combined with the stabilized polypropylene. Each of the specimens were placed in an oven at 300° F. and the elapsed time at initial failure was noted. Initial failure is indicated when the specimens began to chalk and/or crumble. The results of these tests are illustrated in Table I as follows:

TABLE I

| | Time to initial failure, days |
|---|---|
| 25% bark fiber | 72 |
| 40% asbestos | 2 |

EXAMPLE II

In order to illustrate the stabilizing effect of bark fibers when molded with unstabilized polypropylene flakes, several samples were formed employing different amounts of bark fibers. Three additional samples were formed using 40% asbestos, 40% talc and 40% kaolin type clay incorporated into the unstabilized polypropylene flakes. Specimens approximately 1" x 1" x .0080" were formed in an injection molding process. All these specimens were placed in an oven at 300° F. and the time elapsed at initial failure was noted. Initial failure is indicated when the specimens began chalking and/or crumbling. The results of this test are illustrated in Table II.

TABLE II

| | Time to initial failure, hours |
|---|---|
| Unfilled, unstabilized polypropylene flake | 24 |
| 20% bark fibers | 48 |
| 30% bark fibers | 72 |
| 40% bark fibers | 96 |
| 50% bark fibers | 102 |
| 40% asbestos (anthophyllite) | 16 |
| 40% talc | 16 |
| 10% clay (kaolin type) | 16 |

EXAMPLE III

The physical properties of Douglas fir bark fibers and polypropylene molding compositions of the present invention were studied. Thus, flake polypropylene and Douglas fir bark fibers were blended for five minutes prior to molding at different levels of content of the Douglas fir bark fibers. Physical properties were tested in accordance with ASTM test methods and compared to a conventional asbestos filled product. All products were molded at 370° F. The physical properties of the final product are listed under the following table:

ene against heat aging. In the third example it was shown that improved modulus of elasticity, particularly in flexure, and higher impact resistance and heat distortion temperatures also result when Douglas fir bark fiber is used in a polypropylene molding composition.

While various specific examples of preferred procedure embodying the present invention have been described above, it will be apparent that many changes and modifications may be made in those methods of procedure without departing from the spirit of the invention. It should, therefore, be understood that the examples cited and the methods of procedures set forth are intended to be illustrative only and not intended to limit the scope of the invention.

What is claimed is:

1. A thermoplastic molding composition premix comprising a particulate polypropylene resin and Douglas fir bark fiber, said Douglas fir bark fiber being present in an amount ranging between 5 and 50% by weight, said bark fiber being dispersed throughout said molding composition to provide a uniform mixture.

2. The thermoplastic molding composition premix as set forth in claim 1 wherein the Douglas fir bark fiber may range between 24 and 325 mesh, Tyler Sieve series.

3. The premix of claim 1 wherein the moisture content of said Douglas fir bark fiber may range up to 8%.

4. The premix of claim 1 wherein the size of said Douglas fir bark fiber may range between 24 and 325 mesh, Tyler Sieve series with a moisture content of up to 8%.

TABLE III

| Properties | ASTM test method | Bark fibers | | | | | | | | | Asbestos, 40% |
|---|---|---|---|---|---|---|---|---|---|---|---|
| | | 0% | 5% | 10% | 15% | 20% | 25% | 30% | 35% | 40% | |
| Tensile modulus: | | | | | | | | | | | |
| 10³ p.s.i., 0.2"/min | D-638 | 233 | 284 | 277 | 336 | 390 | 390 | 434 | 474 | 469 | |
| 10³ p.s.i., 2.0"/min | | 208 | 240 | 219 | 214 | 299 | 299 | 231 | 208 | 198 | |
| Tensile stress at yield point | D-638 | 5,920 | 5,860 | 5,730 | 5,600 | 5,520 | 5,280 | | | | 5,030 |
| Flexural strength, p.s.i., .05"/min | D-790 | 9,000 | 8,780 | 8,765 | 8,580 | 8,567 | 8,183 | | | | 7,924 |
| Flexural modulus, 10³ p.s.i., .05"/min | D-790 | 291 | 320 | 368 | 412 | 455 | 512 | 531 | 577 | 610 | 552 |
| IZOD Impact ft./lb./in. notch | | 0.48 | 0.56 | 0.66 | 0.83 | 0.89 | 1.10 | 1.14 | 0.99 | 1.02 | 0.57 |
| Deflection temperature at 264 p.s.i., °F | D-648 | 156 | 159 | 162 | 171 | 192 | 190 | 188 | 189 | 200 | 160 |

EXAMPLE IV

The stratification tendencies of the Douglas fir bark fibers of the present invention when combined with polypropylene flake were tested and compared to the stratification of polypropylene flake combined with conventional asbestos reinforcing material. Thus, 40% by weight of asbestos was mixed with a conventional polypropylene flake material in a tumble blender for five minutes. Also, 40% by weight of Douglas fir bark fibers and polypropylene flake material were combined for five minutes in the same tumble blender. Each of the materials was placed in jars and then vibrated for a period of one minute. By visual inspection the Douglas fir bark fibers exhibited no stratification with the polypropylene flakes. On the other hand, the asbestos filled polypropylene molding composition exhibited a high degree of stratification.

As can be seen from the first two examples, Douglas fir bark fiber acts as an effective stabilizer for polypropyl- References Cited

UNITED STATES PATENTS

| 2,446,551 | 8/1948 | Pauley | 209—311X |
| 2,697,081 | 12/1954 | Heritage | 260—17.2 |
| 2,890,231 | 6/1959 | Heritage et al. | 260—412.5 |
| 3,245,869 | 4/1966 | Gregory et al. | 162—55 |
| 3,361,690 | 1/1968 | Gregory et al. | 260—17.4 |

FOREIGN PATENTS 675,907   12/1963   Canada.

OTHER REFERENCES

Modern Plastics Encyclopedia for 1966, September 1965, p. 594.

Kresser: "Polypropylene," Reinhold 1960, pp. 9–10, 138, TP986. P56K72.

WILLIAM H. SHORT, Primary Examiner

E. A. NIELSEN, Assistant Examiner